3,828,103
INDIRECT HEMAGGLUTINATION TEST WITH SIMULTANEOUS ABSORPTION OF HETEROLOGOUS ANTIBODIES
Koichiro Fujita, Tokyo, Japan, assignor to Fujizoki Pharmaceutical Co., Ltd., Tokyo, Japan
No Drawing. Filed Nov. 4, 1970, Ser. No. 87,014
Claims priority, application Japan, Nov. 10, 1969, 44/89,314
Int. Cl. G01n 1/00, 29/00, 33/16
U.S. Cl. 424—12
3 Claims

ABSTRACT OF THE DISCLOSURE

An indirect hemagglutination test is provided herein whereby an antigen is adsorbed onto erythrocytes of animal origin and agglutination of the antigen-sensitized erythrocytes is induced by the action of an antibody specific to the adsorbed antigens, said method characterized in that the heterologous agglutinins present in the serum to be tested and which might react with the homologous red blood cells used as the antigen carrier are removed by use of a solution of decomposed red blood-cell membranes of the animal red blood cells. The present invention also provides for a reagent composed essentially of the aforementioned solution in conjunction with the erythrocytes containing the antigens adsorbed thereupon.

---

The present invention is concerned with an indirect hemagglutination test with simultaneous absorption of heterologous antibodies. More particularly, the present invention is concerned with an indirect hemagglutination test by absorption and removal from reaction of such heterologous agglutinins contained in the serum to be tested which might react with the homologous animals red blood cells used as antigen carriers. This is accomplished by the use of a solution of a decomposed red blood-cell membrane of the same animal red blood cells as those used as the antigen-sensitized carrier.

Heretofore, in the field of serology, there has been employed, a method by which an antigen is adsorbed (sensitized) onto erythrocytes of animal origin whereby agglutination of the antigen-sensitized erythrocytes is induced by the action of an antibody specific to the adsorbed antigen. This method has been called the indirect or passive hemagglutination test. By this test, it is possible to detect an antibody with a very high specificity and sensitivity. According to this method, erythrocytes of animal origin are used as the antigen carriers. These erythrocytes are fixed previously in formalin or some other agent, pre-treated with tannic acid, bis-diazo-benzene, and glutaraldehyde, and are then allowed to adsorb various types of protein antigens. The antigen-sensitized carriers thus-prepared are mixed to serum samples which have already been diluted with physiological saline or phosphate buffered saline. The mixture is then examined for the presence or absence of agglutination of the sensitized erythrocytes after a certain period of time.

The indirect hemagglutination reaction, however, has always been bothered by nonspecific agglutination. That is, agglutination which occurs without the presence of a given specific antibody. One of the problems in this method is to remove the cause of this type of agglutination. In pursuit of this end, various modifications have been made in respect to the compositions employed as the reaction medium (diluent) to eliminate these nonspecific reactions. The types of diluents devised up to the present, contain physiological saline or phosphate buffered saline as the basic solution and the following additional components: (1) animal serum or its components, (2) animal serum or its components, heated, and (3) animal serum, or its components, mixed with a mucilaginous agent and a nonionic surface active agent. These modifications were developed to eliminate non-specific reactions, and to dilute the serum sample adequately.

It must be emphasized, however, that there are two types of non-specific hemagglutination reactions. One reaction is called spontaneous hemagglutination, requiring no antibody components. The other reaction is called heterologous hemagglutination and requires the presence of heterologous (heterophile) antibodies. The diluents mentioned above eliminate spontaneous hemagglutination, but all of these methods have failed to inhibit heterologous hemagglutination. Therefore, the following method has been developed to eliminate the latter reaction: Heterologous (heterophile) antibodies contained in the serum sample were allowed to react with the corresponding antigen, so that they might lose their ability to react and become absorbed out of the reaction mixture. In this method, before testing with antigen-sensitized erythrocytes, the serum to be tested (usually mixed with the reaction medium) was mixed with non-sensitized erythrocytes which are the same as those used as the carrier. When the non-sensitized erythrocytes had reacted with the non-specific antibodies, the mixture was centrifuged, and the resulting supernatant was collected and subjected to further testing for the appropriate hemagglutination reaction now using coated cells.

In the above method whereby erythrocytes are used as the reacting source of such absorption, the test for reaction with the antigen-sensitized erythrocytes must be preceded by the process of absorption of the heterologous antibodies. According to this method it is also required to separate the erythrocytes used for the absorption process from the serum in the test after this process has been performed for removal of the heterologous antibodies. Accordingly, this technique is complicated and time-consuming.

It is an object of the present invention, to establish a simple method to carry out the above-described hemagglutination test. More specifically the object of the present invention is to perform the absorption of the heterologous (heterophile) antibodies concurrently and in parallel to the essential test with the antigen-sensitized erythrocytes. This is attained by use of the same solution of the red blood-cell membranes of the animal erythrocytes used as the antigen-sensitizing material as the source of reaction for the absorption of the heterologous antibodies.

In other words, it is a characteristic feature of the present invention to absorb the heterologous (heterophile) antibodies, which are contained in the serum to be tested and, which ordinarily react with the antigen-sensitized erythrocytes, by using a solution of the decomposed blood-cell membrane of the same animal erythrocytes as employed in the indirect hemagglutination test. Judging from the properties of the solution of such red blood-cell membranes, it acts to absorb the heterologous antibodies and prevent the heterologous antibodies from participating in any reaction with the antigen-sensitized erythrocytes even when they have been mixed simultaneously with the antigen-sensitized erythrocytes in the serum to be tested. In this manner, it prevents the heterologous antibodies from reacting with the sensitized erythrocytes. This fact has been verified by the experiment mentioned below. Furthermore, since the solution of decomposed red cell membranes is liquid in nature, it does not interfere with the determination of the presence or absence of agglutination of the antigen-sensitized erythrocytes even if it remains in its original form in the serum to be tested.

As can be seen by the above explanation, the present invention has made it possible to perform the process of absorption of the heterologous antibodies simultaneously and in perfect parallel with the essential tests for carrying out the reaction with the antigen-sensitized erythrocytes.

Further, according to the present method, the technique is very simple and the time required for the whole method to be accomplished has been reduced to less than half the time needed for the conventional method where the erythrocyte is used as a source of reaction for the absorption. Particularly, the present invention has brought about a great advantage in respect to the practical aspects of the hemagglutination test. It is only by the applicant's method that the antigen-sensitized erythrocytes (main reagent of the test), the reaction solution (auxiliary reagent of the test), and the source of reaction for the absorption process (auxiliary reagent of the test) have been combined successfully into a single reagent for the first time. In conducting the test, it is enough to mix a given amount of the serum to be tested with the single reagent jointly prepared in order to obtain satisfactory results from the hemagglutination test. Consequently, the degree of professional knowledge and skill necessary in performing the hemagglutination test has been reduced for the newly invented method as compared to the conventional one. With these points in mind, the present invention will be described in detail below:

EXPERIMENT CONDUCTED

The effect of the present invention mentioned above was verified in an experiment which was conducted on such diseases as chronic thyroiditis, hemolytic streptococcal infection, and rheumatoid arthritis to be stated below. Three methods, the newly invented method, the conventional method, and a control method, were carried out comparatively in this experiment. In the conventional method, the same serum was allowed to react with non-sensitized erythrocytes fixed simply in formalin, and the antigen-sensitized erythrocytes and non-sensitized erythrocytes were allowed to react after the process of absorption by erythrocytes previously fixed in formalin. In the newly invented method, a solution of decomposed red blood-cell membranes was used in place of the non-sensitized formalin fixed RBC's. In the control method, the same serum was allowed to react with the same sensitized erythrocytes and non-sensitized erythrocytes, without conducting the process of absorption at all. The table attached shows the results of comparison of the three methods.

From this table, it is clear that in each disease, heterologous agglutinin against non-sensitized erythrocytes in the control method exhibited no reaction in the newly invented or the conventional method. No influence was observed at all upon the behavior in the reaction with the sensitized erythrocytes (agglutinin titer) in either of these two methods. These results indicate that immediately after the antigenic component of the solution of decomposed blood-cell membrane in the invented method had been mixed with the serum to be tested, it formed a heterologous antigen-antibody complex with the heterologous hemagglutinin contained in the serum to be tested (although such a complex could not be recognized by the naked eye). It did not react, however, with heterologous hemagglutinogen contained in the sensitized erythrocytes or non-sensitized erythrocytes themselves. These facts indicate that a so-called specific antigen-antibody reaction was established as a result of sensitization with each specific antigen.

The following techniques were employed to accomplish the method of the present invention.

PROCEDURES ACTUALLY PERFORMED (1) Preparation of a solution for decomposition of red blood-cell membranes Sheep blood cells were washed three times in physiological saline solution by centrifugation, so that packed red blood cells were precipitated. To one volume of these packed blood cells was added ten volumes of distilled water and the mixture was stirred in a cold room for more than an hour until hemolysis took place. The suspension showing hemolysis was centrifuged at 3,000 r.p.m. for 30 minutes to precipitate the red blood-cell membranes. The resulting supernatant was discarded. The precipitated red blood-cell membranes were suspended in the same amount of phosphate buffered saline (hereinafter referred to as PBS) as the initial amount of packed blood cells used. The resultant suspension was sonicated at 10 kilocycles for 30 minutes to destroy the red blood-cell membranes. It was then subjected to high-speed centrifugation of 10,000 r.p.m. for 30 minutes to precipitate the few red blood-cell membranes that had not yet been destroyed. These precipitated cells were discarded. The supernatant liquid thus produced was a solution of decomposed blood-cell membranes, and was stored at 4–6° C. until use.

(2) Procedures actually performed in the case of chronic thyroiditis (a) Procedure of sensitization: Sheep red blood cells were fixed in physiological saline solution to which 3 w./v. percent formalin had been added. Then they were treated with a 1:100,000 dilution of tannic acid in PBS. One volume of a suspension of these erythrocytes is 2.5 v./v. percent PBS was mixed with one volume of a solution of thyroglobulin extracted from the human thyroid tissue in PBS at the rate of 500 μg. per milliliter. Thyroglobulin antigen was allowed to be adsorbed on the surface of the erythrocytes at 37° C. for 30 minutes. After that, the erythrocytes were recovered by centrifugation at 1,500 r.p.m. for 25 minutes and washed three times with PBS by centrifugation.

(b) Procedure of preparation of a diluent (also used for absorption): Healthy rabbit serum was added to the PBS to a final concentration of 1% (v./v.). To this was further added a solution of decomposed blood-cell membranes mentioned in paragraph (1) at a concentration of 2 percent (v./v.).

(c) Procedure of preparation of a reagent as source of reaction for simultaneous absorption: The sensitized erythrocytes mentioned in paragraph (a) were added to the diluent mentioned in paragraph (b) at the rate of 0.25 percent (v./v.).

(d) Method of test: A series of 8 or 9 small test tubes were set up. The reagent, as the source of reaction for simultaneous absorption mentioned in paragraph (c), was dispensed into these tubes in such amounts that tube No. 1 contains about 1.9 ml. and all other tubes about 0.6 ml. Then 0.1 ml. of the serum to be tested was added to tube No. 1 and mixed well. To tube No. 2 was transferred 0.6 ml. of the mixture contained in tube No. 1. This same step was repeated on the other tubes so that a series of twofold dilutions might be obtained. Then 0.5 ml. of each dilution was placed on a hemagglutination test plate and allowed to stand. Observation was made by the naked eye to determine whether the sensitized erythrocytes had agglutinated with one another (positive) or not (negative). The agglutinin titer of the serum in the test was expressed by the highest dilution of this serum that had shown the agglutination.

(3) Procedures actually performed in the case of hemolytic streptococcal infection (a) Procedure of sensitization: As the antigen employed, a 250 μg./ml. solution of streptokinase extracted from the filtrate of a hemolytic Group A streptococcal culture was used. The other steps taken were the same as those mentioned in paragraph (2)(a).

(b) Procedure of preparation of a diluent (used also for absorption): Healthy rabbit serum was added to PBS to a concentration of 1 percent (v./v.), and heated at 110° C. for 20 minutes. After cooling, this suspension was mixed with the solution of decomposed red blood-cell membranes mentioned in paragraph (1) in essentially the same manner as stated in paragraph (2)(b).

(c) Procedure of preparation of the reagent as a source of reaction for simultaneous absorption: The sensitized erythrocytes mentioned in paragraph (a) were added to the diluent stated in paragraph (b) in essentially the same manner as specified in paragraph (2)(c).

(d) Method of test: The method used for the test was the same as that shown in paragraph (2)(d).

(4) Procedures actually performed in the case of rheumatoid arthritis (a) Procedure of sensitization: Gamma-globulin fraction separated from healthy rabbit serum was dissolved in PBS at the rate of 3 mg. per milliliter, and degenerated by heating at 63° C. for 10 minutes before using as an antigen. The other steps taken were the same as mentioned in paragraph (2)(a).

(b) Procedure of preparation of a diluent: Bovine serum albumin was added to PBS at the rate of 0.05 w./v. percent. To this was then added the solution of decomposed blood-cell membranes in essentially the same manner as stated in paragraph (2)(b).

(c) Procedure of preparation of the reagent as source of reaction for simultaneous absorption: The sensitized erythrocytes mentioned in paragraph (a) were added to the diluent stated in paragraph (b) in essentially the same manner as specified in paragraph (2)(c).

(d) Method of test: The method used for the test was the same as that shown in paragraph (a)(d).

TABLE SHOWING RESULTS OF EXPERIMENTS

| Diagnosis | Sample | Method | Erythrocytes used | | | | | | | | | | | | | | | | | | | | |
|---|---|---|---|---|---|---|---|---|---|---|---|---|---|---|---|---|---|---|---|---|---|---|---|
| | | | Sensitized erythrocytes | | | | | | | | | | | Non-sensitized-erythrocytes | | | | | | | | | |
| | | | Serum dilution | | | | | | | | | | | | | | | | | | | | |
| | | | 20 | 40 | 80 | 160 | 320 | 640 | 1,280 | 2,560 | 5,120 | 10,240 | 20 | 40 | 80 | 160 | 320 | | | | | |
| Chronic thyroiditis | Serum A | Invented method | +++ | +++ | +++ | +++ | +++ | +++ | +++ | +++ | ++ | − | − | − | − | − | − | | | | | |
| | | Conventional method | +++ | +++ | +++ | +++ | +++ | +++ | +++ | +++ | ++ | − | − | − | − | − | − | | | | | |
| | | Control method | − | − | − | − | − | − | − | − | − | − | ++ | ++ | ++ | + | − | | | | | |
| | Serum B | Invented method | +++ | +++ | +++ | +++ | +++ | +++ | ++ | ++ | − | − | − | − | − | − | − | | | | | |
| | | Conventional method | +++ | +++ | +++ | +++ | +++ | +++ | ++ | ++ | − | − | − | + | + | − | − | | | | | |
| | | Control method | − | − | − | − | − | − | − | − | − | − | ++ | ++ | + | − | − | | | | | |
| | Serum C[1] | Invented method | − | − | − | − | − | − | − | − | − | − | − | − | − | − | − | | | | | |
| | | Conventional method | − | − | − | − | − | − | − | − | − | − | − | + | + | − | − | | | | | |
| | | Control method | ++ | ++ | + | + | − | − | − | − | − | − | ++ | ++ | + | − | − | | | | | |
| Homolytic streptococcal infection | Serum A | Invented method | +++ | +++ | +++ | +++ | +++ | +++ | − | − | − | − | − | − | − | − | − | | | | | |
| | | Conventional method | +++ | +++ | +++ | +++ | +++ | +++ | − | − | − | − | − | + | + | − | − | | | | | |
| | | Control method | − | − | − | − | − | − | − | − | − | − | ++ | ++ | ++ | + | − | | | | | |
| | Serum B | Invented method | +++ | +++ | +++ | +++ | +++ | +++ | − | − | − | − | − | − | − | − | − | | | | | |
| | | Conventional method | +++ | +++ | +++ | +++ | +++ | +++ | ++ | − | − | − | − | + | + | − | − | | | | | |
| | | Control method | − | − | − | − | − | − | − | − | − | − | ++ | ++ | ++ | + | − | | | | | |
| | Serum C[1] | Invented method | − | − | − | − | − | − | − | − | − | − | − | − | − | − | − | | | | | |
| | | Conventional method | − | − | − | − | − | − | − | − | − | − | − | + | + | − | − | | | | | |
| | | Control method | ++ | ++ | + | + | − | − | − | − | − | − | ++ | ++ | + | − | − | | | | | |
| Rheumatoid arthritis | Serum A[2,3] | Invented method | +++ | +++ | +++ | ++ | ++ | − | − | − | − | − | − | − | − | − | − | | | | | |
| | | Conventional method | +++ | +++ | +++ | +++ | +++ | +++ | − | − | − | − | − | + | + | − | − | | | | | |
| | | Control method | − | − | − | − | − | − | − | − | − | − | ++ | ++ | ++ | + | − | | | | | |
| | Serum B[3] | Invented method | +++ | +++ | +++ | +++ | +++ | +++ | − | − | − | − | − | − | − | − | − | | | | | |
| | | Conventional method | +++ | +++ | +++ | +++ | +++ | +++ | − | − | − | − | − | + | + | − | − | | | | | |
| | | Control method | − | − | − | − | − | − | − | − | − | − | ++ | ++ | ++ | + | − | | | | | |
| | Serum C[1] | Invented method | − | − | − | − | − | − | − | − | − | − | − | − | − | − | − | | | | | |
| | | Conventional method | − | − | − | − | − | − | − | − | − | − | − | + | + | − | − | | | | | |
| | | Control method | ++ | ++ | + | + | − | − | − | − | − | − | ++ | ++ | + | − | − | | | | | |

[1] Serum C appearing in the table is serum from the same person presumed normal and healthy, i.e. it is healthy human serum containing heterologous hemagglutinins.
[2] There is no relation between serum A in chronic thyroiditis and serum A in hemolytic streptococcal infection and also serum A in rehumatoid arthritis.
[3] Such classifications as serum A and serum B are used to classify the samples of sera from each disease.

What I claim is:

1. A reagent for use in an indirect hemagglutination test consisting essentially of antigen sensitized erythrocytes and a buffered solution of liquified decomposed erythrocytes prepared from erythrocytes homologous to the antigen sensitized erythrocytes by first laking the erythrocytes and then subjecting them to sonification sufficient to destroy their membranes, said sonification being effected at about 10 kilocycles for about 30 minutes.

2. In an indirect hemagglutination test whereby antigen sensitized erythrocytes are agglutinated by an antibody, specific for said antigen, contained in a test serum, and the test serum is absorbed with an agent to remove heterologous agglutinins which might react with the antigen sensitized erythrocytes, the improvement comprising employing as said test serum absorbing agent a solution of liquified decomposed erythrocytes, prepared from erythrocytes homologous to the antigen sensitized erythrocytes, by first laking the erythrocytes and then subjecting them to sonification sufficient to destroy their membranes, said sonification being effected at about 10 kilocycles for about 30 minutes.

3. In an indirect hemagglutination test whereby antigen sensitized erythrocytes are agglutinated by an antibody, specific for said antigen, contained in a test serum, and the test serum is absorbed with an agent to remove heterologous agglutinins which might react with the antigen sensitized erythrocytes, the improvement comprising forming a single test reagent by mixing together said antigen sensitized erythrocytes and the test serum absorbing agent, adding the test serum to effect agglutination upon the presence therein of the specific antibody, said test serum absorbing agent consisting of a solution of liquified decomposed erythrocytes prepared from erythrocytes homologous to the antigen sensitized erythrocytes by first laking the erythrocytes and then subjecting them to sonification sufficient to destroy their membranes, said sonification being effected at about 10 kilocycles for about 30 minutes.

References Cited

UNITED STATES PATENTS 3,492,212   1/1970   Searcy _____ 195—1.7

OTHER REFERENCES

Milgrom: Virology, vol. 33, 1967, pp. 145–149.

Frisch: PSEBM, vol. 124, February 1967, pp. 344–347.

Tomcsik: Path. et Micro., vol. 23, 1960, pp. 172–183.

ALBERT T. MEYERS, Primary Examiner

A. P. FAGELSON, Assistant Examiner

U.S. Cl. X.R.

424—3, 11, 13